June 26, 1945.    S. L. BURGWIN    2,378,897
RESISTANCE WELDING CIRCUIT
Filed Nov. 20, 1943
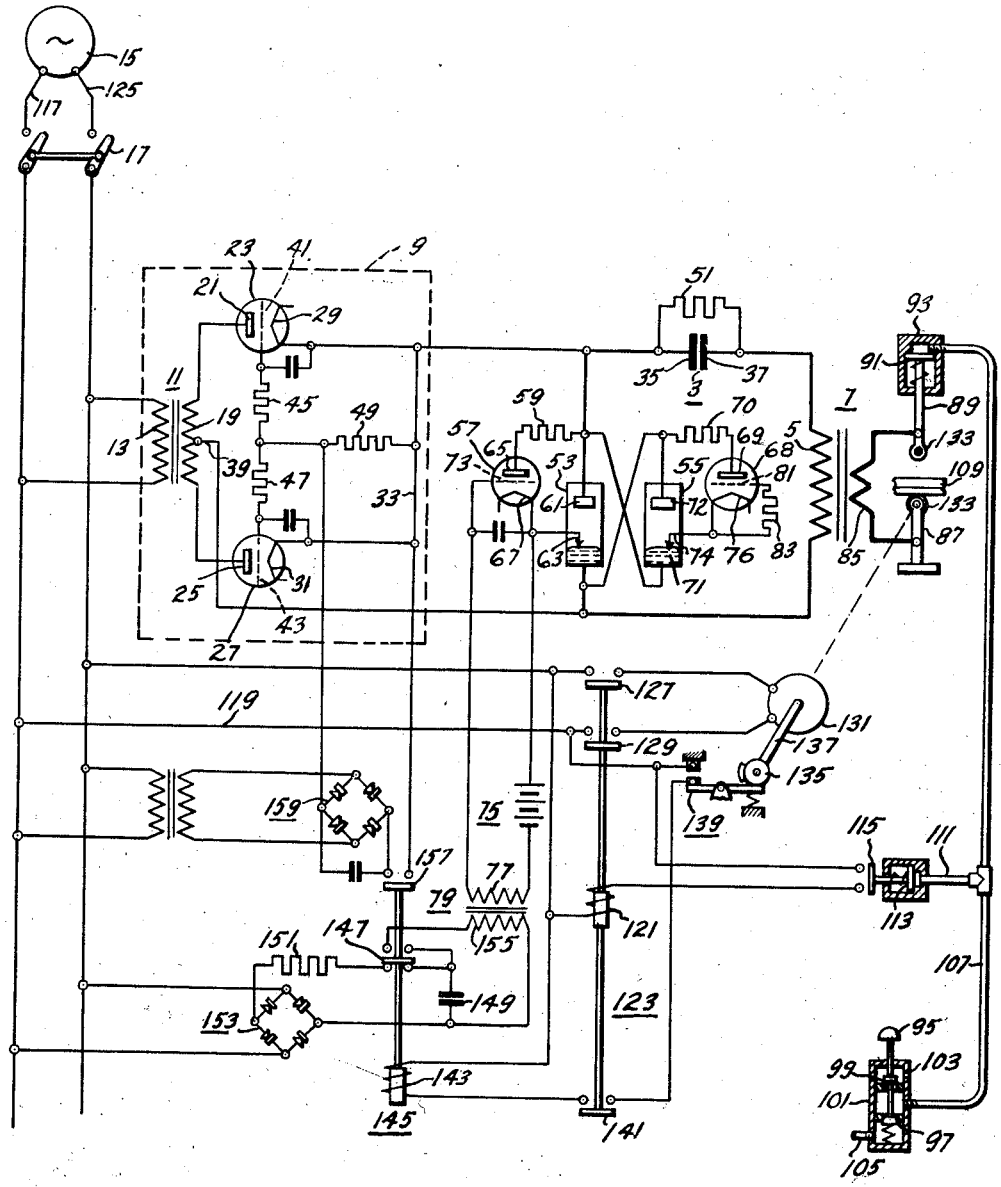
WITNESSES:
INVENTOR
Stephen L. Burgwin.
BY
ATTORNEY Patented June 26, 1945

2,378,897

UNITED STATES PATENT OFFICE 2,378,897

RESISTANCE WELDING CIRCUITS

Stephen L. Burgwin, Forest Hills, Pa., assignor to Westinghouse Electric Corporation, East Pittsburgh, Pa., a corporation of Pennsylvania Application November 20, 1943, Serial No. 511,044

14 Claims. (Cl. 219—4)

This invention relates to a resistance welding control system and has particular relation to an electronic system for controlling the discharge of a power capacitor through the primary winding of a welding transformer.

A system for producing high quality welds known as capacitor discharge welding has been developed in recent years. A capacitor is precharged with a voltage of a magnitude which is preselected in accordance with the properties of the material to be welded. The charging circuit for the capacitor is blocked and the capacitor is then discharged rapidly through the primary winding of a welding transformer, the secondary winding of the transformer being connected to supply energy to welding electrodes. Discharge of the capacitor through the transformer causes sufficient current to flow through the welding electrodes and the material clamped therebetween to weld the material. It is customary to operate such a welding system in a manner to produce a number of welds in rapid succession.

In apparatus constructed in accordance with the teachings of the prior art, an electric discharge valve of the arc-like type, such as an ignitron, is interposed between the primary winding of the transformer and the capacitor to control the instant of discharge of the capacitor. The charging circuit for the capacitor is effective to charge the capacitor with one polarity. Consequently, if the capacitor is discharged through the primary winding of the welding transformer in the same direction with each operation, the transformer becomes highly saturated after a few successive welds and the efficiency of operation is greatly reduced unless means are provided for resetting the flux of the transformer.

Methods of flux resetting now in commercial use employ a separate direct current source of potential applied to all or part of the primary winding to return the flux to its original state after each discharge of the capacitor. As so much energy is required to reset the flux within a reasonable time with the welding electrodes closed, considering the rapid successive operations desired, this method is believed to be practical only when the welder is used to make a series of spot welds with the electrodes being opened between successive welds. Then the direct current potential may be applied to the primary winding to reset the flux while the welding electrodes are open which requires less energy. However, in many welding operations it is desirable to make a series of successive welds without opening the welding electrodes. Such operations are known as roller spot welding or seam welding and in both cases rollers are mounted on the engaging ends of the welding electrodes and remain in constant engagement with the material to be welded throughout the entire series of welds.

In some welders now in use, relay operated contactors are arranged to reverse the connections of the primary winding of the transformer to the capacitor between successive welds. Thus the capacitor is discharged through the primary winding in opposite directions for successive welding operations and saturation of the transformer is avoided even though the welding electrodes remain closed. Use of the contactors is objectionable, however, because of the short life of the contactors and the time delay imposed between successive welds to permit operation of the contactors.

It is, accordingly an object of my invention to provide a new and improved capacitor discharge welding system in which complete flux resetting is accomplished quickly and efficiently.

Another object of my invention is to provide novel capacitor discharge welding apparatus in which complete flux resetting is quickly accomplished while the electrodes are closed.

Still another object of my invention is to provide a novel system for supplying power from a source to a load through a magnetic core transformer in which saturation of the transformer is avoided.

A further object of my invention is to provide a novel capacitor discharge welding system in which saturation of the welding transformer is avoided without employing an auxiliary flux resetting potential or reversing contactors.

In accordance with my invention a capacitor is connected in series with the primary winding of the welding transformer and a source of direct current. Current for charging the capacitor then flows from the source through the primary winding and the capacitor. Circuit means including electric valve means is connected in parallel across the series connected capacitor and primary winding. With the capacitor precharged, a damped oscillating current tends to flow through the primary winding and capacitor when the electric valve means is conductive. Means are then provided to block the flow of charging current after the capacitor is charged and to render the valve means conductive to permit one cycle only of the oscillating current to flow therethrough. The first pulse of the cycle of oscillating current is sufficient to produce a weld but the second pulse is smaller and is insufficient to produce a weld.

When the valve means is first rendered conductive, the precharged capacitor discharges through the primary winding of the transformer and changes the flux in one direction. During the discharge, magnetic energy is stored in the welding transformer and the closed secondary circuit. After the discharge of the energy originally stored in the capacitor is completed, the magnetic energy stored in the transformer and secondary winding circuit during the discharge is released causing current to continue to flow in the same direction whereby the capacitor is charged inversely and the flux is partially reversed. The inverse charge on the capacitor is immediately discharged back through the primary winding, completing the cycle of oscillating current and further changing the flux in the opposite direction.

As the discharge of the inverse charge on the capacitor is completed, the release of stored magnetic energy causes the capacitor to be partially recharged with its original polarity. The direct current charging circuit is then unblocked and charging of the capacitor through the primary winding proceeds. Thus the same amount of charge passes through the primary winding in one direction as in the other and the flux is completely reset. A resistor may be connected in shunt across the capacitor to permit a predetermined minimum current to flow through the primary winding after the capacitor is charged and thereby to provide a predetermined flux bias for the transformer.

The novel features which I consider characteristic of my invention are pointed out with more particularity in the appended claims. The invention itself, however, both as to its organization and operation, together with additional objects and advantages thereof, will best be understood from the following description of a specific embodiment with reference to the drawing, in which, the single figure is a schematic diagram of the preferred embodiment of my invention.

A seam welder system is shown in the drawing although my invention may also be used in spot welders. The system comprises a capacitor 3 connected in series with the primary winding 5 of a welding transformer 7 and a source of direct current 9. The direct current source 9 includes an auxiliary transformer 11 having a primary winding 13 energized from a source of alternating current 15 through a circuit breaker 17. One terminal of the secondary winding 19 of the transformer 11 is connected to the anode 21 of a rectifier tube 23. The other terminal of the secondary 19 is connected to the anode 25 of a second rectifier tube 27. The rectifier tubes 23 and 27 may be discharge tubes of the arc-like type such as thyratrons and their cathodes 29 and 31, respectively, are connected together by conductor 33 and to one plate 35 of the capacitor 3. The other plate 37 of the capacitor is connected through the primary winding 5 of the welding transformer 7 to the center tap 39 of the secondary winding 19 of the auxiliary transformer 11.

The control grids 41 and 43 of rectifier tubes 23 and 27, respectively, are connected together through their respective grid resistors 45 and 47. The junction between the grid resistors 45 and 47 is connected through another resistor 49 to the cathodes 29 and 31. Thus the control grids 41 and 43 are normally at the same potential as their respective cathodes 29 and 31 so that the tubes 23 and 27 are conductive and direct current flows through the capacitor 3 and the primary winding 5 to charge the capacitor with plate 35 positive. A resistor 51 is connected in shunt across the capacitor 3 to permit a predetermined minimum direct current to flow from the source 9 through the primary winding 5 even after the capacitor 3 attains its full charge. In this manner a predetermined flux bias is provided for the welding transformer which, of course, has a magnetic core.

A pair of ignitrons 53 and 55 are connected in anti-parallel across the series connected capacitor 3 and primary winding 5. An electric discharge valve 57 of the arc-like type, preferably a thyratron and hereafter designated as a firing valve, has its anode 65 connected through a resistor 59 to the anode 61 of the ignitron 53, and its cathode 67 connected to the ignition electrode 63 of the ignitron 53. Another electric discharge valve 68 of the arc-like type, also known as a firing valve has its anode 69 connected through a resistor 70 to the anode 72 of ignitron 55, and its cathode 76 connected to the ignition electrode 74 of the ignitron 55. Consequently, when the anode of either ignitron is positive, the corresponding firing valve may be rendered conductive to supply ignition current through the ignition electrode and thus render the ignitron conductive.

The anode 61 of ignitron 53 and consequently the anode 65 of the corresponding firing valve 57 is connected to the plate 35 of the capacitor 3 which is originally positive. However, the cathode 67 of the firing valve is connected to the grid 73 through a source of biasing potential 75 and the secondary winding 77 of a peaking transformer 79. The peaking transformer 79 is not originally energized and the biasing potential 75 maintains the grid 73 negative with respect to the cathode 67 so that the firing valve 57 associated with ignitron 53 is maintained non-conductive.

The grid 81 of the firing valve 68 associated with ignitron 55 is connected through a resistor 83 to the cathode 76 of the firing valve. Thus, whenever the anode 72 of ignitron 55 and consequently the anode 69 of the corresponding firing valve 68 becomes positive, the firing valve becomes conductive to in turn render the ignitron conductive. It is to be noted that the anode 72 of the ignitron 55 is connected to the plate 37 of capacitor 3 which is originally negative.

The secondary winding 85 of the welding transformer 11 has one terminal connected to a relatively fixed welding electrode 87 and the other terminal of the secondary winding 85 is connected to a movable electrode 89. The electrode 89 has a spring biased piston 91 on the end thereof within a cylinder 93, to be operated by hydraulic pressure.

To initiate a welding operation, a push button 95 may be depressed to open an inlet valve 97 and close a pressure release valve 99 in a fluid valve member 101. Closure of the valve 99 prevents the escape of fluid pressure through a release opening 103. Opening of inlet valve 97 permits the application of fluid pressure from a source not shown through an inlet pipe 105, valve 97, and pipe 107 to cylinder 93. The pressure on piston 91 in cylinder 93 causes the electrode 89 to be moved downwardly toward electrode 87 to clamp the material 109 to be welded therebetween.

After the electrode 89 is in firm engagement with the material 109, the back pressure through pipe 111 operates on piston 113 to close a switch 115. When switch 115 is closed, a circuit is completed from one side 117 of the alternating current source 15 through the circuit breaker 17, conductor 119, switch 115, energizing coil 121 of a relay 123, and breaker 17 to the other side 125 of the source. Energization of relay 123 closes its contactors 127 and 129 completing a circuit from the source 15 through a motor 131.

As the welder illustrated is to be employed in seam welding operations wherein a series of individual welds are to be made without opening the welding electrodes, the electrodes 87 and 89 are provided with rollers 133 for engagement with the material 109. The material 109 is to be moved into a new position for each weld by power supplied from motor 131. For purposes of illustration, the motor is shown diagrammatically as connected to the roller 133 on the fixed electrode 87 to supply driving power thereto. The motor 131 is driven in synchronism with the source 15 and a cam member 135 is mounted on a shaft 137 of the motor. The cam member 135 is arranged to operate a switch 139 which causes a weld to be made in a manner to be hereinafter explained. The cam member is designed to maintain the switch 139 closed during a desired welding period and open for a predetermined time interval between successive welding periods. If necessary, a gear box may be inserted between the motor and the cam member to change the relative speed of the cam member. Other suitable timing means may, of course, be employed if desired.

When switch 139 is closed, a circuit is completed from one side 117 of the source 15 through circuit breaker 17, conductor 119, switch 139, contactor 141 of relay 123 (now closed), energizing coil 143 of another relay 145 and circuit breaker 17 to the other side 125 of the source. Contactor 147 of relay 145 is normally closed to effect charging of an auxiliary capacitor 149 through a resistor 151 and a full wave rectifier 153 energized from the source 15. When relay 145 is energized, contactor 147 breaks the charging circuit for auxiliary capacitor 149 and closes the discharge circuit for the capacitor through the primary 155 of the peaking transformer 79. The peaking transformer is thus energized and the impulse supplied from its secondary winding 77 overcomes the biasing potential supplied from source 75 and renders the firing valve 57 associated with ignition 53 conductive.

At the same time the other contactor 157 of relay 145 closes to impress a direct current biasing potential from an auxiliary source 159 across the resistor 49 in the grid-cathode circuits of rectifier tubes 23 and 27. The biasing potential appearing across resistor 49 maintains the rectifier tubes 23 and 27 non-conductive to stop the flow of charging current from the source 9 to the main capacitor 3.

When the firing valve 57, associated with ignitron 53, becomes conductive, current begins to flow from the capacitor 3 through the resistor 59, the firing valve 57 and the ignition electrodes 63 to render the ignitron 53 conductive. As soon as the ignitron 53 becomes conductive the potential across the associated firing valve 57 drops so low that the firing valve becomes non-conductive.

When ignitron 53 is conductive the precharged capacitor 3 discharges through the ignitron 53 and the primary winding 5 of the welding electrode, causing sufficient current to be supplied through the welding electrodes 89 and 87 and the material 109 to effect a weld. During this discharge of the capacitor 3 magnetic energy is stored in the transformer 7 and its secondary winding circuit. As the potential across the capacitor 3 drops to zero, this stored energy is released, causing the current to continue to flow in the same direction. As a result, the capacitor 3 is charged inversely. When the capacitor 3 attains its maximum inverse charge, the current flow drops to zero and the ignitron 53 becomes non-conductive. At this time the plate 37 of the capacitor 3 is positive and the resultant potential in the discharge circuit is of a polarity that the firing valve 68 associated with ignitron 55 is rendered conductive to in turn render the ignitron 55 conductive. The inverse charge on the capacitor 3 is then discharged through the primary winding 5 of the ignitron 55. It is to be noted, however, that because of the energy spent in welding and the losses in the circuit, the maximum inverse charge on the capacitor 3 is considerably less than the original charge so that the discharge of the inverse charge of the capacitor through the primary winding does not effect a weld.

Following discharge of the inverse charge on the capacitor through the primary winding, the capacitor attains a charge of the original polarity by the release of energy stored in the transformer and its secondary winding circuit during that discharge. Ignitron 55 then becomes non-conductive and because of the biasing potential 75, ignitron 53 is maintained non-conductive. At this time the cam member 135 opens the switch 139 to effect deenergization of relay 145. Contactor 157 of the relay 145 opens removing the biasing potential from resistor 49, thereby permitting charging current to again flow from the source 9 through the capacitor 3 and the primary winding 5. Contactor 147 of the relay 145 also closes to permit recharging of the auxiliary capacitor 149. After a predetermined interval of time during which the material 109 is moved to a new position and capacitor 3 is completely recharged with its original polarity, the cam member 135 recloses switch 139 and another welding operation is performed. Successive welds are made in this manner so long as the push button 95 remains depressed.

As previously indicated a predetermined flux bias is provided for the transformer 7 because of the presence of resistor 51 prior to the initial discharge of the capacitor 3. When the precharged capacitor is discharged through the primary winding 5, the flux is changed in the opposite direction. When the inversely charged capacitor is subsequently discharged through the primary winding, the flux is again changed in the direction of the bias but because the inverse charge on the capacitor is less than the original charge, the flux is not returned entirely to its original state. However, the subsequent recharging of the capacitor through the primary winding completes the resetting of the flux. Thus, the same amount of charge is supplied through the primary winding 5 in one direction as in the other direction and saturation of the transformer is prevented. The operation of the welder may consequently be quite rapid with no delays for the purpose of resetting the flux. Moreover, at the completion of a weld the capacitor has a small charge thereon of the original polarity so that large transients at the initiation of recharging are avoided and conservation of power is effected.

Although I have shown and described a preferred embodiment of my invention, I am aware that many modifications thereof are possible. My invention, therefore, is to be limited only by the spirit of the invention and the scope of the prior art.

I claim as my invention:

1. For use in supplying current to a load through a magnetic core transformer having a primary and a secondary winding with said secondary winding connected in circuit with said load, the combination comprising a capacitor connected in a series circuit with said primary winding, means adapted to supply direct current through said series circuit to charge said capacitor, circuit means including normally non-conductive electric valve means connected to form a discharge circuit across said capacitor and primary winding whereby an oscillating current tends to flow through said discharge circuit when said valve means is conductive, and means for rendering said valve means conductive to permit only one cycle of said oscillating current to flow therethrough.

2. For use in supplying current to a load through a magnetic core transformer having a primary and a secondary winding with said secondary winding being connected in circuit with said load, the combination comprising a capacitor connected in a series circuit with said primary winding, means adapted to supply direct current through said series circuit to charge said capacitor, circuit means including electric discharge valve means of the arc-like type connected across said capacitor and primary winding whereby an oscillating current tends to flow through said capacitor and primary winding when said valve means is conductive, and means for rendering said valve means conductive to permit only one cycle of said oscillating current to flow therethrough.

3. For use in supplying current to a load through a magnetic core transformer having a primary and a secondary winding with said secondary winding being connected in circuit with said load, the combination comprising means adapted to function as a source of direct current, a capacitor connected in series with said source means and said primary winding whereby said capacitor is precharged, a resistor connected in shunt across said capacitor to permit a predetermined minimum current to flow through said primary winding after said capacitor is charged to provide a predetermined flux bias for said transformer, circuit means including electric discharge valve means connected across said capacitor and primary winding whereby an oscillating current tends to flow through said capacitor and primary winding when said valve means is conductive, and means for rendering said valve means conductive to permit only one cycle of said oscillating current to flow therethrough.

4. For use in supplying current to a load through a magnetic core transformer having a primary and a secondary winding with said secondary winding being connected in circuit with said load, the combination comprising a capacitor connected in a series circuit with said primary winding, means adapted to supply direct current through said series circuit to charge said capacitor, a first electric discharge valve of the arc-like type connected in parallel with said series-connected capacitor and primary winding, means for rendering said first valve conductive after said capacitor is charged, said first valve being capable of conducting current in a direction to effect discharge of said capacitor through said primary winding whereby said capacitor is subsequently charged inversely, a second electric discharge valve of the arc-like type connected in anti-parallel with said first valve, and means operable when said first valve becomes non-conductive following said discharge for rendering said second valve conductive to effect discharge of the inversely charged capacitor through said primary winding.

5. For use in supplying current to a load through a magnetic core transformer having a primary and a secondary winding with said secondary winding being connected in circuit with said load, the combination comprising means adapted to function as a source of direct current, a capacitor connected in series with said primary winding and said source means whereby said capacitor is charged, a resistor connected in shunt across said capacitor to permit a predetermined minimum current to flow through said primary winding after said capacitor is charged to provide a predetermined flux bias for said transformer, a first electric discharge valve of the arc-like type connected in parallel with said series-connected capacitor and primary winding, means for rendering said first valve conductive after said capacitor is charged, said first valve being capable of conducting current in a direction to effect discharge of said capacitor through said primary winding whereby said capacitor is subsequently charged inversely, a second electric discharge valve of the arc-like type connected in anti-parallel with said first valve, and means operable when said first valve becomes non-conductive following said discharge for rendering said second valve conductive to effect discharge of the inversely charged capacitor through said primary winding.

6. For use in supplying current to a load through a magnetic core transformer having a primary and a secondary winding with the secondary winding being connected in circuit with said load, the combination comprising means adapted to function as a source of direct current, a capacitor connected in series with said source means and said primary winding whereby said capacitor is charged, circuit means including electric valve means connected to form a discharge circuit across said capacitor and primary winding whereby an oscillating current tends to flow through said discharge circuit when said valve means is conductive, and timing means operable to block the flow of current from said source means to said series-connected capacitor and primary winding and said valve means for a predetermined time period and to render said valve means conductive during said period to permit only one cycle of said oscillating current to flow through said discharge circuit, said timing means being operable repeatedly at timed intervals of sufficient length to permit charging of said capacitor between successive periods.

7. Apparatus for use in welding a material with equipment including welding electrodes in engagement with said material and a magnetic core transformer having a primary and a secondary winding with said secondary winding being connected in circuit with said electrodes, comprising a capacitor connected in a series circuit with said primary winding, means adapted to supply direct current through said series circuit to charge said capacitor to a first voltage, a first electric discharge valve of the arc-like type connected in parallel with said series-connected capacitor and primary winding, means for rendering said first valve conductive after said capacitor is charged, said first valve being capable of conducting current in a direction to effect a first discharge of said capacitor through said primary winding whereby said capacitor is subsequently charged inversely to a second voltage less in magnitude than said first voltage, a second electric discharge valve of the arc-like type connected in anti-parallel with said first valve, and means operable when said first valve becomes non-conductive following said discharge for rendering said second valve conductive to effect a second discharge of the inversely charged capacitor through said primary winding, the magnitudes of said first and second voltages being such that said first discharge is sufficient and said second discharge is insufficient to produce a weld.

8. Apparatus for use in welding a material with equipment including welding electrodes in engagement with said material and a magnetic core transformer having a primary and a secondary winding with said secondary winding being connected in circuit with said electrodes, comprising means adapted to function as a source of direct current, a capacitor connected in series with said primary winding and said source means whereby said capacitor is charged to a first voltage, a resistor connected in shunt across said capacitor to permit a predetermined minimum current to flow through said primary winding after said capacitor is charged to provide a predetermined flux bias for said transformer, a first electric discharge valve of the arc-like type connected in parallel with said series-connected capacitor and primary winding, means for rendering said first valve conductive after said capacitor is charged, said first valve being capable of conducting current in a direction to effect a first discharge of said capacitor through said primary winding whereby said capacitor is subsequently charged inversely to a second voltage less in magnitude than said first voltage, a second electric discharge valve of the arc-like type connected in anti-parallel with said first valve, and means operable when said first valve becomes non-conductive following said discharge for rendering said second valve conductive to effect a second discharge of the inversely charged capacitor through said primary winding, the magnitudes of said first and second voltages being such that said first discharge is sufficient and said second discharge is insufficient to produce a weld.

9. Apparatus for use in welding a material with equipment including welding electrodes in engagement with said material and a magnetic core transformer having a primary and a secondary winding with said secondary winding being connected in circuit with said electrodes, comprising means adapted to function as a source of direct current, a capacitor connected in series with said source means and said primary winding whereby said capacitor is charged, circuit means including electric valve means connected to form a discharge circuit across said capacitor and primary winding whereby a damped oscillating current tends to flow through said discharge circuit when said valve means is conductive, and timing means operable to block the flow of current from said source means to said series-connected capacitor and primary winding and said valve means for a predetermined time period and to render said valve means conductive during said period to permit only one cycle of said oscillating current to flow through said discharge circuit, said timing means being operable repeatedly at timed intervals of sufficient length to permit charging of said capacitor between successive periods, the first pulse of said one cycle of oscillating current being sufficient to produce a weld and the second pulse being insufficient to produce a weld.

10. Apparatus for use in welding a material with equipment including welding electrodes in engagement with said material and a magnetic core transformer having a primary and a secondary winding with said secondary winding being connected in circuit with said electrodes, comprising means adapted to function as a source of direct current, a capacitor connected in series with said source means and said primary winding whereby said capacitor is charged, a resistor connected in shunt across said capacitor to permit a predetermined minimum current to flow through said primary winding after said capacitor is charged to provide a predetermined flux bias for said transformer, circuit means including electric valve means connected to form a discharge circuit across said capacitor and primary winding whereby a damped oscillating current tends to flow through said discharge circuit when said valve means is conductive, and timing means operable to block the flow of current from said source means to said series-connected capacitor and primary winding and said discharge circuit for a predetermined time period and to render said valve means conductive during said period to permit only one cycle of said oscillating current to flow through said discharge circuit, said timing means being operable repeatedly at timed intervals of sufficient length to permit charging of said capacitor between successive periods, the first pulse of said one cycle of oscillating current being sufficient to produce a weld and the second pulse being insufficient to produce a weld.

11. For use in supplying current to a load through a magnetic core transformer having a primary and a secondary winding with said secondary winding being connected in circuit with said load, the combination comprising a capacitor connected in a series circuit with said primary winding, means adapted to supply direct current through said series circuit to charge said capacitor, a first electric discharge valve of the arc-like type connected in parallel with said series-connected capacitor and primary winding, timing means operable after said capacitor is charged to block the flow of current from said current supply means to said series circuit and said first valve for a predetermined time period and to render said first valve conductive during said period, said first valve being capable of conducting current in a direction to effect discharge of said capacitor through said primary winding whereby said capacitor is subsequently charged inversely, a second electric discharge valve of the arc-like type connected in anti-parallel with said first valve, and means operable when said first valve becomes non-conductive following said discharge for rendering said second valve conductive to effect discharge of the inversely charged capacitor through said primary winding, said timing means being operable repeatedly at timed intervals of sufficient length to permit charging of said capacitor between successive periods.

12. Apparatus for use in welding a material with equipment including a magnetic core transformer having a primary and a secondary winding with the secondary winding being connected in circuit with welding electrodes engaging the material, comprising a capacitor connected in a series circuit with said primary winding, means adapted to supply direct current through said series circuit to charge said capacitor to a predetermined voltage, circuit means including normally-non-conductive electric valve means connected to form a discharge circuit across said capacitor and primary winding whereby a damped oscillating current tends to flow through said discharge circuit when said valve means is conductive, and means for rendering said valve means conductive to permit only one cycle of said oscillating current to flow therethrough, said predetermined voltage being of a magnitude that the first pulse of said one cycle of current is sufficient and the second pulse is insufficient to produce a weld.

13. A control system comprising an inductive load, a capacitor connected in a series circuit with said load, means adapted to supply direct current through said series circuit to charge said capacitor, normally non-conductive, electric valve means connected in parallel circuit relation with said series connected capacitor and load whereby an oscillating current tends to flow therethrough when said valve means becomes conductive, and means for rendering said valve means conductive to permit a single cycle only of oscillating current to flow through said load.

14. For use in supplying current to a load through a magnetic core transformer having a primary and a secondary winding with said secondary winding being connected in circuit with said load, the combination comprising a capacitor connected in a series circuit with said primary winding, means adapted to supply direct current through said series circuit to charge said capacitor, a first electric discharge valve of the arc-like type connected in parallel with said series-connected capacitor and primary winding, means for rendering said first valve conductive after said capacitor is charged, said first valve being capable of conducting current in a direction to effect discharge of said capacitor through said primary winding whereby said capacitor is subsequently charged inversely, a second electric discharge valve of the arc-like type connected in anti-parallel with said first valve, and means responsive to a change in the polarity of the potential across said second valve when said capacitor is charged inversely and operable when said first valve becomes non-conductive following said discharge for rendering said second valve conductive to effect discharge of the inversely charged capacitor through said primary winding.

STEPHEN L. BURGWIN.